United States Patent [19]

Sarto

[11] 4,308,845
[45] Jan. 5, 1982

[54] EARLY FUEL EVAPORATION WITH BYPASS

[75] Inventor: Jorma O. Sarto, Orchard Lake, Mich.

[73] Assignee: Chrysler Corporation, Highland Park, Mich.

[21] Appl. No.: 87,278

[22] Filed: Oct. 22, 1979

[51] Int. Cl.³ ............................................. F02M 31/00
[52] U.S. Cl. .................................. 123/549; 123/546; 261/142
[58] Field of Search .............. 123/549, 546, 552, 590, 123/593; 261/142; 219/206, 207

[56] References Cited

U.S. PATENT DOCUMENTS

| | | | |
|---|---|---|---|
| 2,719,520 | 10/1955 | Balzer | 123/549 |
| 3,945,361 | 3/1976 | Piotrourcz | 123/593 |
| 3,987,772 | 10/1976 | McBride | 123/549 |
| 4,088,104 | 5/1978 | Ibbott | 123/593 |
| 4,114,580 | 9/1978 | Coats | 123/593 |
| 4,141,327 | 2/1979 | Marcoux | 261/142 |
| 4,187,820 | 2/1980 | Webster | 123/593 |
| 4,242,999 | 1/1981 | Hoser | 123/549 |

FOREIGN PATENT DOCUMENTS

| | | | |
|---|---|---|---|
| 1476178 | 9/1969 | Fed. Rep. of Germany | 123/593 |
| 5268800 | 1/1979 | Japan | 123/593 |

Primary Examiner—Ronald H. Lazarus
Attorney, Agent, or Firm—Newtson & Dundas

[57] ABSTRACT

Heating apparatus for the air-fuel mixture of a vehicle engine including a perforated grid placed across the flow of the air-fuel mixture. The grid is spaced downward from the outlet of the carburetor. A bypass housing formed of permeable screen material may be placed with an open inlet end registered with the carburetor outlet and with an open outlet end registered with the face of the heating grid. During engine start and idle modes with or without use of a choke all of the fuel-air mixture passes through the grid. During off-idle engine modes which require substantially greater flow rates, a portion of the mixture may bypass the grid and pass through the permeable walls of the bypass housing.

3 Claims, 5 Drawing Figures

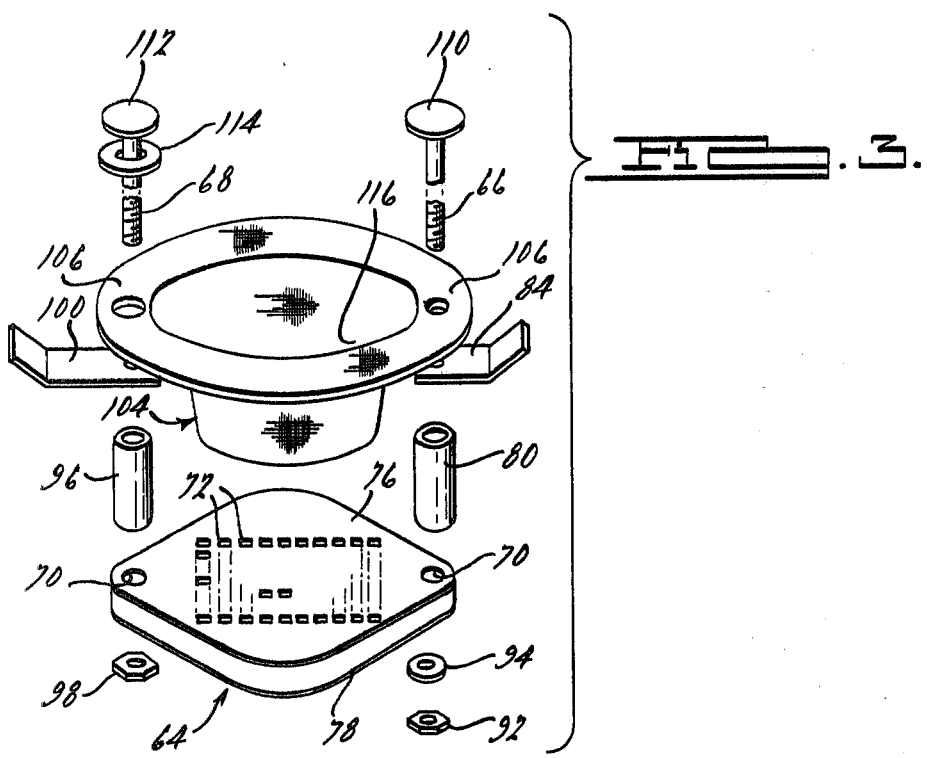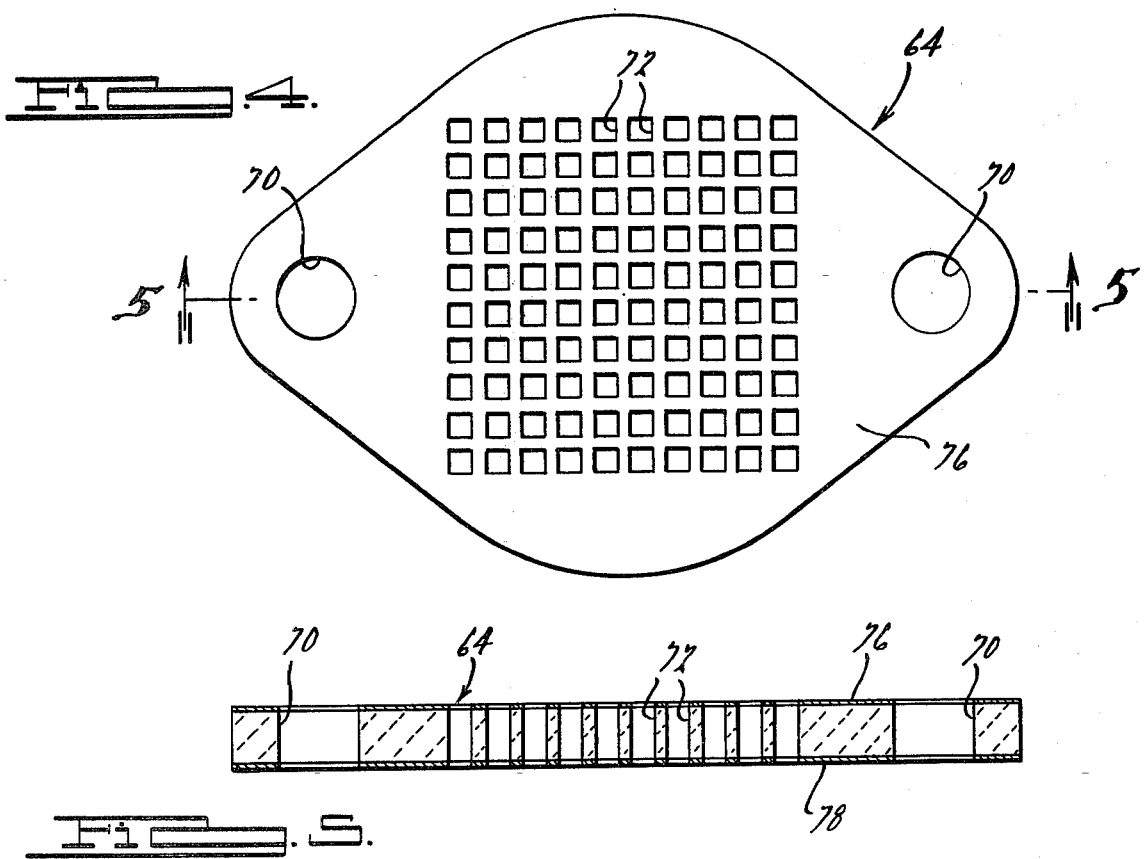

EARLY FUEL EVAPORATION WITH BYPASS

This invention relates to heating apparatus for the air-fuel mixture of an engine and includes a mounting means to permit portions of the mixture to bypass the heater when fluid flow demands are relatively large.

Present regulations established by the Environmental Protection Agency reduce allowable unburned hydrocarbon emissions of a vehicle to incredibly small quantities as compared with unregulated engines. The previous addition of catalytic converters to vehicles effectively reduced these emissions. However, emissions of hydrocarbons is still a concern particularly during starting and subsequent engine warm-up. During this period, the mixture is rich and the carburetor and the engine intake passages are cool. Thus, fuel tends to condense thereon and form relatively large liquid droplets, rather than forming fine droplets or a vaporous mixture. A much leaner mixture might be utilized if the large droplets could be eliminated and resultantly hydrocarbon and other emissions might be reduced.

During engine operation and particularly during the engine starting and warm-up modes, the mixture entering the engine should be of relatively high temperature. As previously stated, fuel that is passing through a cool intake manifold tends to condense and to collect. Warming the flow prevents this and it is known to use an electrical heater to increase the temperature. The specific heater may take many forms yet the basic concept is well known.

The preferred form of heater in the subject application is a perforated grid made of a specific ceramic material. The material possesses a positive temperature coefficient of resistance. This means that when an electrical potential is first placed across the material, the low initial resistance of the material permits a relatively large flow of current therethrough so as to increase its temperature. As the temperature increases, however, its resistance increases so that the material will automatically exhibit and maintain a given heating characteristic at a given voltage. Each side of the heating grid has a metallic coating which form electrical connections to a voltage source and serve to evenly spread the electrical potential across the grid thickness. Such a ceramic heating grid is disclosed in U.S. Pat. Nos. 4,108,125 and 4,141,327 which issued Aug. 22, 1978 and Feb. 27, 1979 respectively.

The heating grid is normally located across the fluid flow through the carburetor outlet and the fluid mixture passes through a plurality of openings in the grid. However, in testing a substantial restriction to flow has been observed which is objectionable under certain engine modes. During testing and development, a grid was placed across the outlet of a one barrel carburetor mounted on a 225 cubic inch displacement engine. During cruise or wide open throttle modes, engine power losses proved to be excessive. The 225 C.I.D. six cylinder engine demonstrated power losses as large as 25.2 horsepower at 4400 RPM. A data chart and specification list is found at the end of the detailed description and just before the claims.

The subject invention concerns the application of a grid type heater for a fuel-air mixture. A bypass means is disclosed in cooperative association with the heater to decrease flow restriction during off-idle engine modes. During these part throttle and wide open throttle modes only a portion of the mixture flows through the heater grid. The remainder flows through the bypass. Specifically, the grid is spaced downstream from the outlet of the carburetor. In one embodiment, a bypass housing is utilized and characterized as a hollow member formed of screen-type material with open ends. During starting and the warm-up modes, practically all of the mixture passes through the bypass interior defined by the screened housing and subsequently through the heater grid. However, when the engine power requirements are greater and flow rates increase part of the mixture then bypasses the heating grid. In an embodiment utilizing a screened bypass housing, large fuel droplets are intercepted during flow through the screen. They subsequently collect and pass down the screen to the heated grid where vaporization may take place.

Therefore, an advantageous feature of the subject heater assembly is the provision of a heating grid located a spaced distance below the inlet to the intake manifold or the outlet of the carburetor so that during engine modes requiring low fluid or mixture flow rates substantially all the flow is directed to the heater grid. But during engine modes requiring greater mixture flows, a substantial portion of the flow passes laterally through a bypass means or space between the grid and the carburetor outlet.

Another advantageous feature of the subject heater assembly is the provision of a heating grid having plural flow openings therethrough in combination with a bypass mounting which takes the form of a generally funnel like member of screen-type material to direct fluid flow to the heating grid particularly during start and idle modes of engine operation but which permits a portion of the flow to pass directly through the walls of the housing during cruise and wide open throttle modes.

Another feature and object of the subject heater assembly is the provision of a heating grid having plural flow openings therethrough which provides flow of a fuel-air mixture therethrough in combination with a permeable bypass flow housing with its inlet end positioned to receive flow from the carburetor and an outlet end positioned to discharge through heating grid whereby during engine operation requiring a large fluid flow, a substantial portion of the mixture passes directly through the permeable sides of the bypass housing.

Other advantages and objects of the present invention will be even more readily apparent from a reading of the following detailed description reference being had to the drawings in which a preferred embodiment is illustrated.

IN THE DRAWINGS

FIG. 3, is a perspective assembly view of the bypass housing and heating grid;

FIG. 4 is an enlarged planar view of the heating grid;

FIG. 5 is an enlarged section view of the heating grid taken along section lines 5—5 in FIG. 4.

Figure 1:
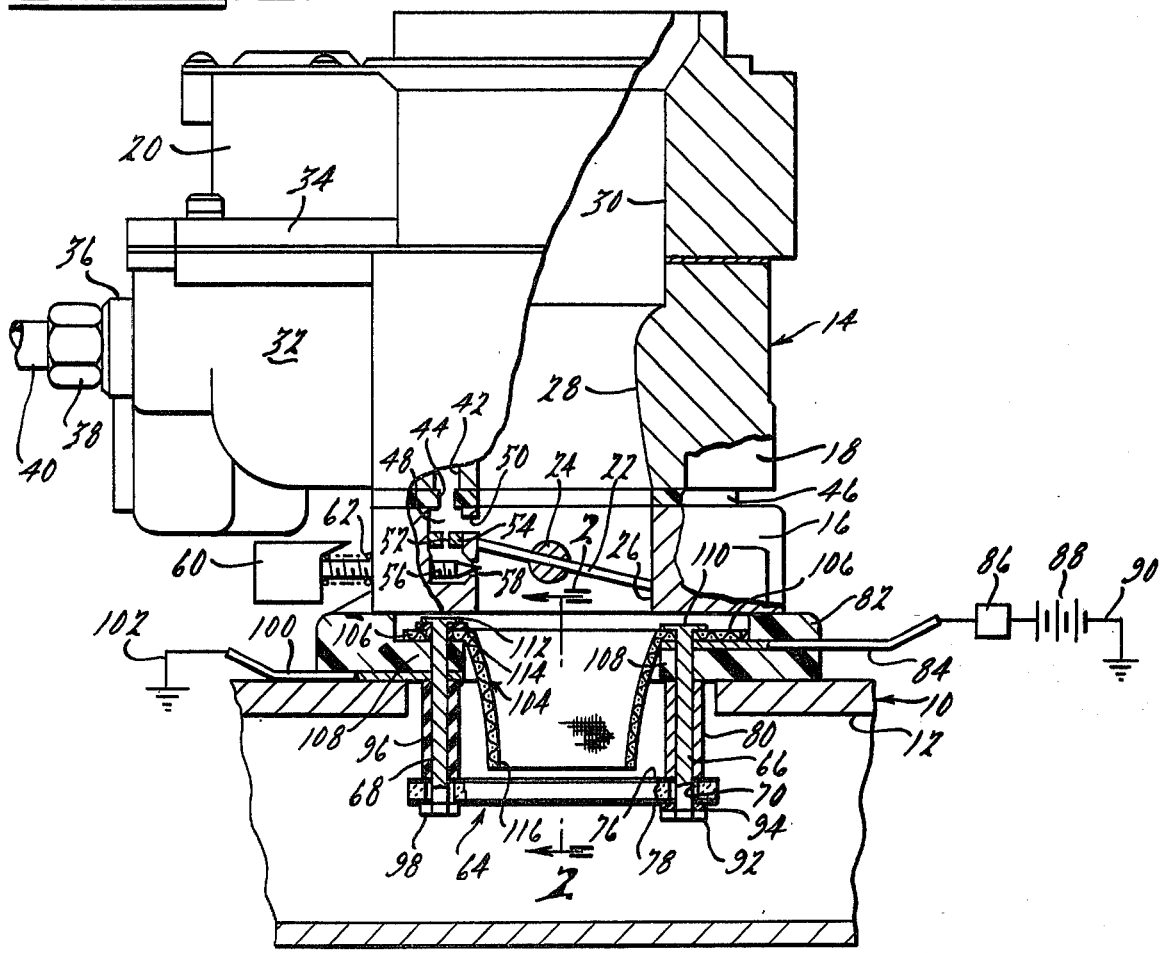
FIG. 1, is a fragmentary view of an engine's carburetor and a portion of the intake manifold showing the subject heating grid and bypass housing.

In FIG. 1, the intake manifold 10 of an internal combustion-type engine is illustrated. The manifold 10 defines a passage 12 through which a fuel-air combustion mixture passes to the engine cylinders (not shown). The manifold 10 supports carburetor assembly 14 which includes a throttle body portion 16, a venturi forming main body portion 18 and an air horn or inlet portion 20. The throttle body portion 16 includes a pivotal throttle blade 22 mounted upon a rotative shaft 24. The throttle blade 22 operates to regulate the flow quantity of fuel and air through main passage 26. The passage 26 is aligned with a similar passage in a main body portion 18. A constricted throat portion 28 in the main body 18 produces a low pressure condition therein so that fuel may be drawn and mixed with air flowing therethrough. An inlet passage 30 through the air horn portion 20 is in alignment with the restricted passage 28. The main body portion 18 also includes a fuel bowl forming portion generally indicated by the numeral 32 and covered by portion 34 of the air horn housing. An inlet fitting 36 connects by a nut fastener 38 to a conduit 40. The conduit 40 carries fuel from the vehicle fuel pump and fuel tank.

In a conventional manner, a float control inlet valve (not shown) controls the discharge of fuel into the fuel bowl portion 32. From fuel bowl 32, fuel is drawn through passages to the venturi 28 during off-idle operating conditions. During an idle mode of engine operation in which the throttle blade 22 is in the closed position shown in FIG. 1, fuel flows from the fuel bowl through a separate idle passage where it mixes with air. The fuel-air mixture then is drawn downward through the vertical idle well passage 42. An opening 44 in gasket member 46 connects passage 42 with a space 48. Space 48 is connected to the passage 26 upstream of blade 22 through a transfer slot or port 50. When the throttle blade 22 is moved slightly from the closed position shown in FIG. 1, the fuel and air mixture is drawn from space 48 and past the blade 22 for entry into the intake manifold 10.

However, during idle when the throttle blade 22 is in the closed position, the mixture passes through a restrictor or orifice 52 which is formed in member 54. The flow then passes over the end of a needle valve 56 and through opening 58. Needle valve 56 is threadably received by the throttle body 16. The end of the needle valve 56 extends through the opening or idle port 58 and into the passage 26. During an idle mode of operation, mixture passes between the end of valve 56 and the walls of opening 58 to control the flow in a regulated manner. The needle valve 56 has a slotted head portion 60 so that it can be readily adjusted and a spring 62 is placed between the head 60 and the throttle body 16 to maintain the threads in snug relation to prevent unintended rotation. It is this relative movement between the end of the needle valve and the port 58 which provides a desired idling mixture. Since the idle system must operate for a considerable period of time while the engine is relatively cool, a rich idling system is usually necessary. Unfortunately, such richness enhances the formation of liquid within the intake manifold 12. As previously discussed, this is undesirable.

The subject fuel delivery system also includes a fluid heater 64 to warm the mixture flowing from the passage 26 of carburetor 14. The heater 64 is supported by fasteners 66 and 68 which are located at diametrically opposite positions as best shown in FIG. 4. The heater 64 is a thin member having a generally oval configuration with openings 70 therethrough to receive fasteners 66,68. The mid-portion of the heater 64 includes a plurality of small openings 72 which permit flow of the mixture passing from the carburetor 14 into the intake manifold. The body 74 of heater 64 is made of positive temperature coefficient ceramic material characterized by increased resistance to electricity as temperature increases. Thus, initially the resistance is low and a large current will flow through the ceramic material to increase the temperature of heater and fluid. As the temperature increases, the electrical resistance also increases, which automatically limits the electrical current and the temperature obtained. To enhance the even flow of electrical current through the thickness of the body 74, metallic coating 76, 78 are deposited on opposite flat surfaces of the ceramic body 74.

Referring back to FIG. 1, the electrical connections to the surfaces 76 and 78 are made by the fasteners 66 and 68 respectively. Fastener 66 is metallic and is encircled by a conductive sleeve or spacer 80. The lower end of sleeve 80 engages the metallic surface 76 while the upper end of the sleeve 80 engages an insulative spacer support member 82. The contact between sleeve 80 and fastener 66 connects the surface 76 with a terminal member 84 which is supported by the spacer member 82. Terminal 84 is connected through a thermal switch assembly 86 to the vehicle battery 88. The circuit may also include a vehicle ignition switch. Connector 90 grounds one side of the battery 88. The lower end of the fastener 66 extends through without touching the sides of the opening 70 and is engaged by a nut fastener 92. An insulative washer 94 prevents contact between the fastener 66, member 92 and the metallic surface 78. The other metallic fastener 68 extends through an insulative sleeve 96 which engages the upper metallic coating 76. A nut fastener 98 engages the bottom surface and metallic coating 78 of the heater assembly 64. At the upper end of fastener 68, a terminal member 100 is supported between spacer member 82 and intake manifold 10 to ground this side of the circuit. Also a conductive member 102 may be attached between ground and the terminal 100.

The fuel-air mixture from passage 26 of the carburetor flows directly to the heater during an idle or start mode of operation. The spaced placement of the grid 74 directly below and in line with the opening 26 directs substantially all of the flow toward the heater when flow rates are relatively low such as during starting and idle. At other times, some portion of the flow bypasses the grid 74 and flows laterally with respect to the downward idle flow. In an embodiment utilizing a generally conically shaped housing 104, the flow is more forcefully guided to the grid. However, at higher flow rates, a portion of the flow does pass through the walls of the housing 104. The member 104 is made up of a screen-type material preferably of stainless steel-type, copper or plastic material such as nylon. The side surfaces of the housing are permeable to fluid flow. An upper end has an outwardly turned flange portion 106 which rests upon an inner edge 108 of member 82. A radially extending head portion 110 of fastener 66 holds the portion 106 of housing 104 to the terminal 84 and the spacer member 82. A similarly formed portion 112 of fastener 68 holds the opposite portion 106 of the housing 104 to spacer member 82. An insulative washer member 114 extends between the head portion 112 and the portion 106 of the bypass 104 to prevent electrical contact between flange 106 and fastener member 68 and thus shorting of the grid heating circuit.

Figure 2:
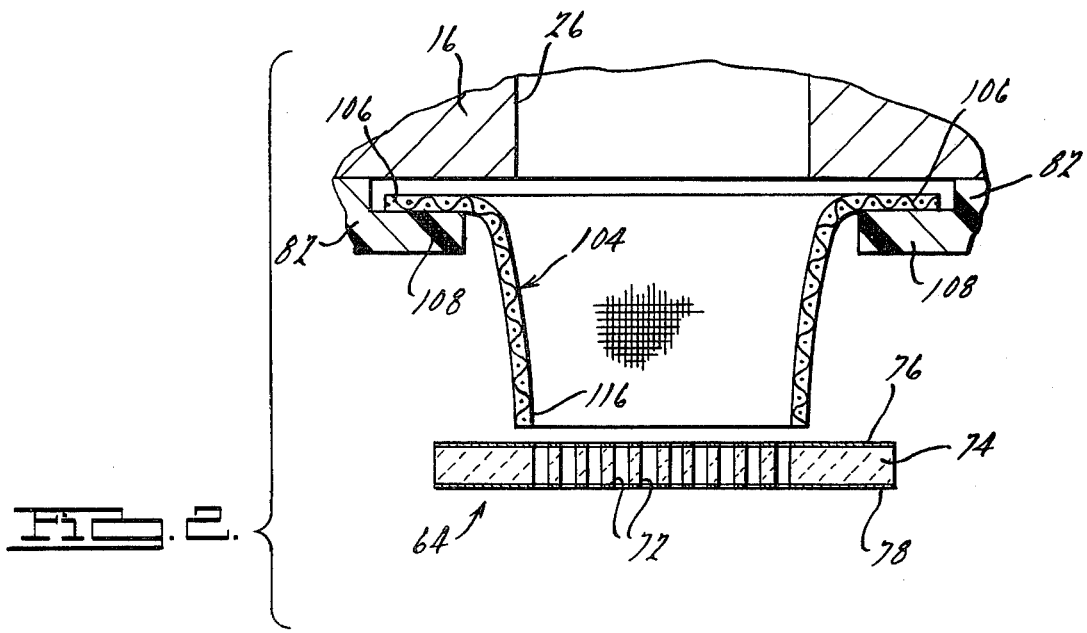
FIG. 2, is an enlarged sectioned view of the heating grid and bypass housing 1 taken along section lines 2—2 in FIG. 1.

The lower end of the bypass housing is open at 116 and aligned with the apertured portion of heater 64 so that fluid passing through the housing interior is directed through the many openings 72 as can be seen in FIG. 2. During a starting or idling mode of engine operation, a substantial portion of the mixture passes through the grid heater. During start and idle modes, the flow required for engine operation relative to other operative modes is relatively low so that practically all the air-fuel mixture will pass through the openings 72 of the heater 64. When the engine is operated at cruise or wide open throttle modes of operation, the throttle blade 22 is moved from the closed position shown in FIG. 1 and the fluid flow is increased substantially. If all this greatly increased flow were to pass through the grid openings 72, the flow restriction would greatly reduce the engine power and performance. As previously mentioned, tests conducted with a 225 C.I.D. 6 cylinder engine equipped with a single barrel carburetor revealed a power loss of about 30% at higher RPMs when the air-fuel mixture had to first pass through the grid heater 64.

Utilizing the bypass housing 104 between the carburetor 14 and a downwardly spaced heater grid 64, the aforementioned large power losses were practically eliminated. During the off-idle engine modes when the fluid flow through the carburetor increases greatly, a large portion of the flow passes through the permeable walls of the bypass 104. Meanwhile, a relatively small portion of the flow passes through the openings 72 in the heater grid 64. Resultantly, the flow restriction at off-idle is substantially decreased. It should be noted that the flow area through the screen-type walls of member 104 is large compared with the flow area through the passages 72 due to the geometry including the large continuous side surface of the member 104. The data hereafter indicates that a 225 C.I.D. engine with a bypass produced only about 3% less power than a standard 225 C.I.D.

An advantage of providing the screen sided housing 104 is the ability thereof to intercept rather large fuel droplets before their entry into the intake manifold 10. These droplets collect and combine to form a substantial quantity of wasted liquid fuel. With housing 104, the droplets are directed downward and along the screen until reaching heater 64. Upon contact with the grid, the fuel droplets quickly vaporize and are picked up by air passing therethrough. Tests on a vehicle having a 225 CID engine with a single barrel carburetor disclosed substantial reductions in engine start-up times and reductions in CO under power.

Although only a single embodiment of the invention has been illustrated in the drawings and another without the screen housing but otherwise as shown has been described, modifications and other embodiments will easily occur to persons skilled in the art, which modifications would still fall within the scope of the following claims which solely define the invention to which an exclusive property right is asserted. Particularly, other heater and housing support arrangements are possible and other electrical connection makers are contemplated.

Test Specifications

Test Engine #1 - In line 6 cylinder Chrysler engine of 225 CID carburetor: 1.67 inch diameter single bar Test Engine #2 - Same engine and carburetor as #1 Heater Grid - overlying outlet of carburetor Test Engine #3 - Same engine and carburetor as #1 Heater Grid - .375 spaced from the manifold intake

| RPM | HORSEPOWER | | |
|---|---|---|---|
| | #1 | #2 | #3 |
| 1200 | 37.0 | 34.3 | 34 |
| 1600 | 50.0 | 44.8 | 47 |
| 2000 | 62.5 | 54.5 | 58 |
| 2400 | 74.0 | 63.1 | 68 |
| 2800 | 82.6 | 68.8 | 77 |
| 3200 | 89.0 | 71.3 | 84 |
| 3600 | 91.2 | 72.0 | 87.5 |
| 4000 | 89.9 | 68.5 | 88 |
| 4400 | 83.8 | 58.6 | 83 |

I claim:

1. An improved air fuel delivery system for a vehicle engine which includes a flow heater and a flow directing means therefor to provide a substantially uninhibited flow of the air fuel mixture over a wide range of engine speeds to accommodate both idle and wide open throttle operations of the vehicle engine, comprising:

an intake manifold having a single inlet aperture to receive the air flow mixture at varying flow rates ranging from a very low rate at idle to a maximum rate at wide open throttle;

the heater being dimensionally thin and flat with a plurality of small apertures extending therethrough which apertures are aligned with the flow through the single intake aperture of the manifold;

support means for the heater spacing the plurality of apertures therein downwardly from the single inlet aperture of the manifold to therefor define a bypass area with respect to the heater to permit an alternate and laterally directed flow of the air/fuel mixture with respect to the single inlet aperture and the heater when the engine requires a relatively large flow rate, whereby relatively heavy fuel droplets in the air/mixture are carried by inertia to the heater for subsequent heating and then flow through the apertures while simultaneously the lighter portion of the air/fuel mixture may flow in the lateral direction bypassing the heater which occurs particularly during off-idle modes of engine operation when flow rates are relatively great.

2. For an internal combustion engine of a vehicle, an improved air/fuel delivery system including an intake manifold with a single intake aperture for induction of air and fuel from an air/fuel delivery source located upstream with respect to the single manifold inlet aperture and also including flow throttling means upstream from the single manifold aperture to vary the flow of air/fuel mixture therethrough, heater means located downstream from and in spaced relation to the single manifold aperture to permit at least portion of the fluid to pass therethrough in bypass relation to the heater, the heater being characterized by a generally flat and thin dimension with a plurality of many apertures therethrough for conducting fluid flow, means supporting the heater so that the apertures therein are in alignment with the flow of an air/fuel mixture which enters the manifold through the single intake aperture and so that the heater surface is maintained a substantial distance below the single intake aperture thereby defining a bypass area of substantial extent between the surface of the intake manifold around the single inlet aperture and the surface of the heating means, a fluid permeable housing with a hollow interior including an open inlet end portion supported adjacent to the manifold inlet aperture to receive fluid flow therefrom, the permeable housing also including an open outlet end portion so configured and aligned so as to direct a flow of fluid therethrough to the heater and subsequently through the apertures thereof, the housing having a sidewall portion extending between the inlet end portion and the outlet end portion and being of a suitable construction and material to permit a fluid to flow therethrough particularly during off-idle engine operations when substantial flow rates are required by the engine and whereby resistance to fluid flow through the heater apertures is significant.

3. The system set forth in claim 2 in which the permeable housing has a generally frusto-conical configuration with a larger dimensioned inlet end portion aligned to receive the fluid flow from the single manifold inlet aperture and the opposite smaller dimension outlet end portion is located in close relation to one surface of the generally flat heater so as to direct a heavier portion of the air/fuel mixture toward the heater and to its many apertures therein.

* * * * *